US010506564B2

(12) United States Patent
Islam et al.

(10) Patent No.: US 10,506,564 B2
(45) Date of Patent: Dec. 10, 2019

(54) USING RESOURCE ELEMENT LOCATION PATTERN TO CONVEY MCS OF CONTROL CHANNEL

(71) Applicant: QUALCOMM Incorporated, San Diego, CA (US)

(72) Inventors: Muhammad Nazmul Islam, Edison, NJ (US); Sundar Subramanian, Bridgewater, NJ (US); Juergen Cezanne, Ocean Township, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 15/389,104

(22) Filed: Dec. 22, 2016

(65) Prior Publication Data

US 2017/0188353 A1    Jun. 29, 2017

Related U.S. Application Data

(60) Provisional application No. 62/271,981, filed on Dec. 28, 2015.

(51) Int. Cl.
*H04W 72/04* (2009.01)
*H04L 1/00* (2006.01)
(Continued)

(52) U.S. Cl.
CPC ....... *H04W 72/0413* (2013.01); *H04L 1/0003* (2013.01); *H04W 72/085* (2013.01); *H04W 88/02* (2013.01); *H04W 88/08* (2013.01)

(58) Field of Classification Search
CPC ............ H04W 72/0413; H04W 72/085; H04L 1/0003
See application file for complete search history.

(56) References Cited

U.S. PATENT DOCUMENTS

2009/0232237 A1   9/2009  Nakanishi et al.
2009/0257408 A1*  10/2009 Zhang ................... H04L 1/1621
                                                  370/336
(Continued)

FOREIGN PATENT DOCUMENTS

EP      1901491 A1    3/2008
WO   2014107903 A1    7/2014

OTHER PUBLICATIONS

International Search Report and Written Opinion—PCT/US2016/068546—ISA/EPO—dated Apr. 11, 2017.

*Primary Examiner* — Redentor Pasia
(74) *Attorney, Agent, or Firm* — Arent Fox, LLP; Clint R. Morin

(57) ABSTRACT

A mechanism that allows the successful decoding of MCS information of cell edge UEs while retaining the performance for the other UEs of the cell is provided. In one aspect, a UE may determine an uplink control coding rate based on an uplink signal quality. The UE may encode uplink control data based on the uplink control coding rate. The UE may apply a pattern of unused resource element locations in uplink control resource elements based on the uplink control coding rate. The UE may transmit the uplink control resource elements with the pattern of unused resource element locations. In another aspect, an eNB may receive uplink control resource elements. The eNB may determine an uplink control coding rate based on a pattern of resource element locations in the uplink control resource elements. The eNB may decode uplink control data based on the uplink control coding rate.

22 Claims, 17 Drawing Sheets

(51) Int. Cl.
*H04W 72/08* (2009.01)
*H04W 88/02* (2009.01)
*H04W 88/08* (2009.01)

(56) References Cited

U.S. PATENT DOCUMENTS

| | | | | |
|---|---|---|---|---|
| 2011/0292895 | A1* | 12/2011 | Wager | H04L 5/0007 370/329 |
| 2012/0099453 | A1* | 4/2012 | Sagfors | H04L 5/0007 370/252 |
| 2013/0195122 | A1* | 8/2013 | Li | H04L 1/0026 370/479 |
| 2016/0278108 | A1* | 9/2016 | Tong | H04W 72/12 |

* cited by examiner

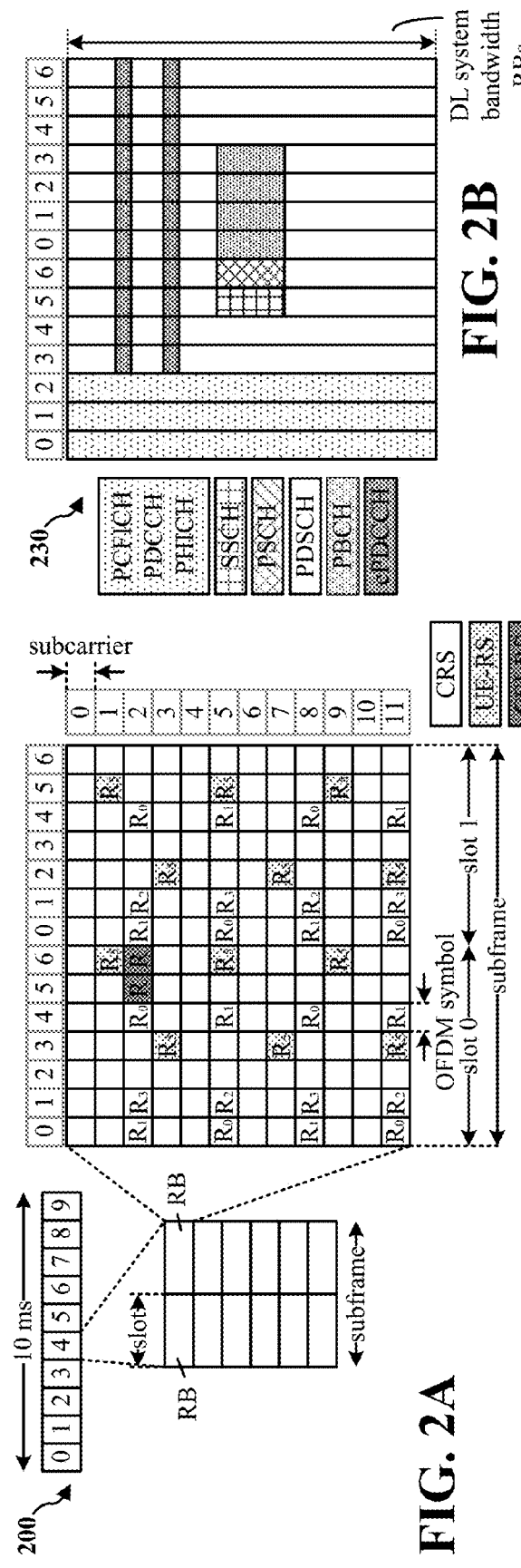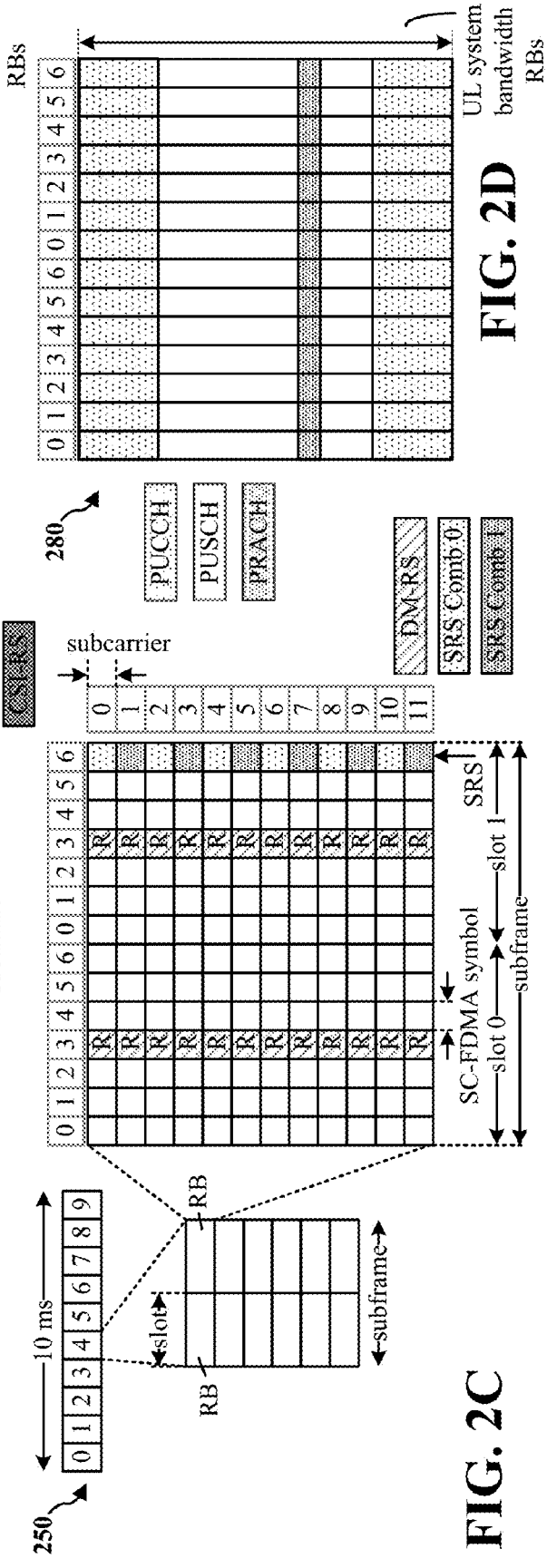
FIG. 2A
FIG. 2B
FIG. 2C
FIG. 2D

| CQI Coding Rate Index | CQI Feedback Amount Per 2ms | SNR Threshold with 5% Block Error Rate |
|---|---|---|
| 1 | 4 bits | 4 dB |
| 2 | 8 bits | 7 dB |
| 3 | 16 bits | 10 dB |
| 4 | 32 bits | 13 dB |

USING RESOURCE ELEMENT LOCATION PATTERN TO CONVEY MCS OF CONTROL CHANNEL

CROSS-REFERENCE TO RELATED APPLICATION(S)

This application claims the benefit of U.S. Provisional Application Ser. No. 62/271,981, entitled "USING RESOURCE ELEMENT LOCATION PATTERN TO CONVEY MCS OF CONTROL CHANNEL" and filed on Dec. 28, 2015, which is expressly incorporated by reference herein in its entirety.

BACKGROUND

Field

The present disclosure relates generally to communication systems, and more particularly, to the conveyance of a modulation and coding scheme (MCS) of a control channel.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

User equipments (UEs) may need to transmit channel quality information (CQI) to base station so that base station can perform downlink scheduling. UEs with different signal-to-noise ratio (SNR) levels may have the capacity to transmit different number of CQI bits. For example, UEs that are located close to base station may transmit a higher number of CQI bits and UEs that are located at cell edge may transmit a lower number of CQI bits. If a fixed number of bits are used to transmit CQI, UEs with poor SNR may not be able to transmit CQI to the base station reliably.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

UEs may need to transmit CQI to base station so that base station can perform downlink scheduling. UEs with different SNR levels may have the capacity to transmit different number of CQI bits. For example, UEs that are located close to BS may transmit a higher number of CQI bits and UEs that are located at cell edge may transmit a lower number of CQI bits.

In one configuration, if UEs transmit variable number of CQI bits, the modulation and coding scheme (MCS) of CQI bits may be transmitted separately to the base station. In such a configuration, the successful decoding of CQI bits may depend on the successful decoding of the MCS information. Cell edge UEs may have poor SNR and the MCS information of their CQI bits may have a high block error rate. Hence, a mechanism that allows the successful decoding of MCS information of cell edge UEs while retaining the performance for the other UEs of the cell is desirable.

In an aspect of the disclosure, a method, a computer-readable medium, and an apparatus for wireless communication are provided. The apparatus may be a UE. The apparatus determines an uplink control coding rate based on an uplink signal quality. The apparatus encodes uplink control data based on the uplink control coding rate. The apparatus may apply a pattern of unused resource element locations in a plurality of uplink control resource elements based on the uplink control coding rate. The apparatus transmits the plurality of uplink control resource elements with the pattern of unused resource element locations.

In another aspect of the disclosure, a method, a computer-readable medium, and an apparatus for wireless communication are provided. The apparatus may be a base station. The apparatus receives a plurality of uplink control resource elements. The apparatus may determine an uplink control coding rate based on a pattern of resource element locations in the plurality of uplink control resource elements. In one configuration, in order to determine the uplink control coding rate based on the pattern of resource element locations, the apparatus may measure energy of resource elements in the pattern of resource element locations, calculate the sum of the energy of the resource elements, and determine the uplink control coding rate based on the sum of the energy of the resource elements. The apparatus decodes uplink control data based on the uplink control coding rate.

In another aspect of the disclosure, a method, a computer-readable medium, and an apparatus for wireless communication are provided. The apparatus may be a base station. The apparatus determines a control channel coding rate for a UE based on a quality of a downlink signal to the UE. The apparatus may encode control information for the UE based on the control channel coding rate. The apparatus may apply a pattern of unused resource element locations in one or more control symbols based on the control channel coding rate. The apparatus transmits control symbols with the pattern of unused resource element locations for the UE.

In another aspect of the disclosure, a method, a computer-readable medium, and an apparatus for wireless communication are provided. The apparatus may be a UE. The apparatus may receive a downlink resource block. The apparatus determines a control channel coding rate based on a pattern of resource element locations in the downlink resource block. In one configuration, in order to determine the control channel coding rate based on the pattern of resource element locations, the apparatus may measure energy of the resource elements in the pattern of resource element locations, calculate the sum of the energy of the resource elements, and determine the control channel coding rate based on the sum of the energy of the resource elements. The apparatus decodes control information for the UE based on the control channel coding rate.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
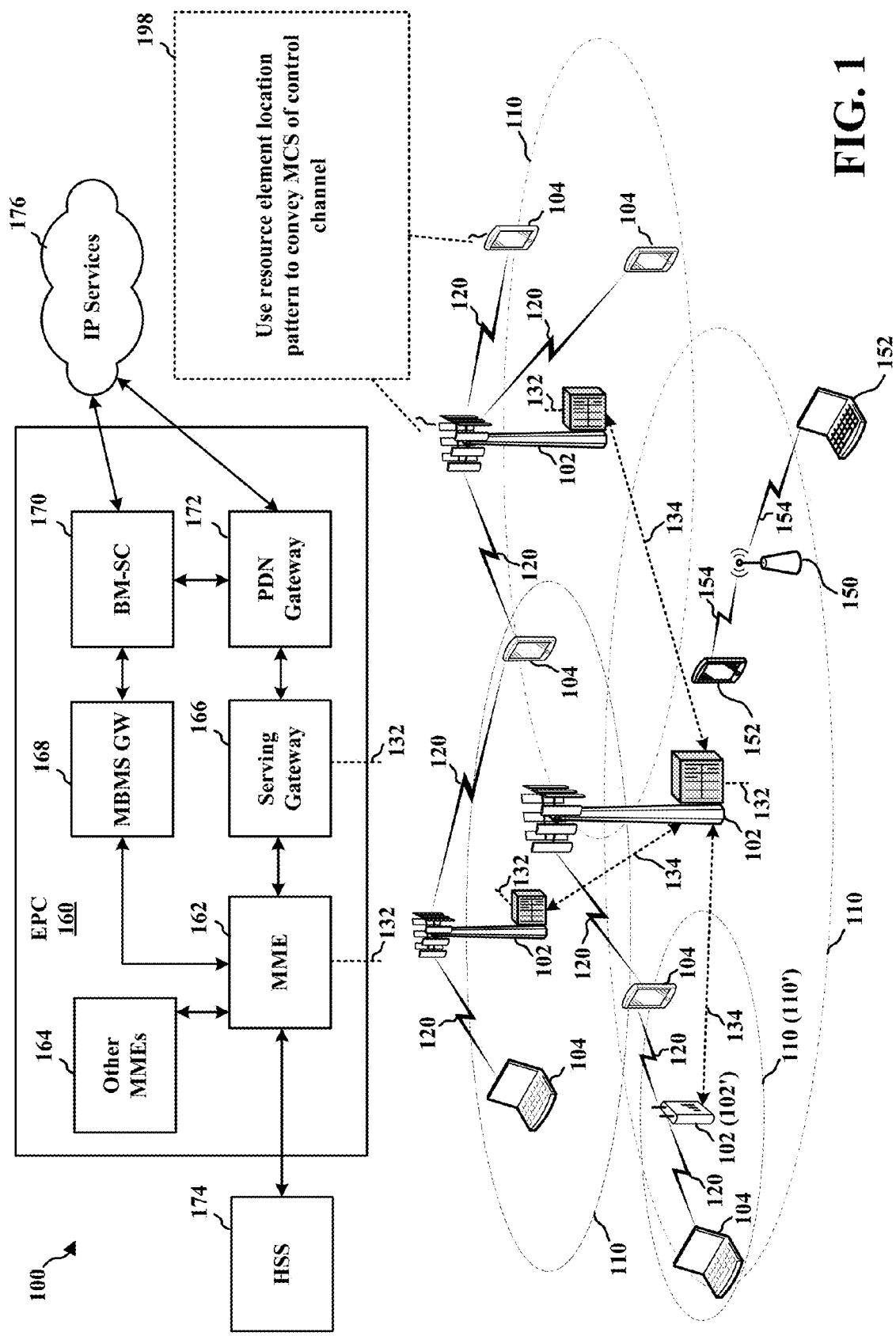
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., 51 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or eNB 102 may be configured to use (198) a resource element location pattern to convey a MCS of a control channel. Details of the operations performed at 198 are described below with reference to FIGS. 4-17.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
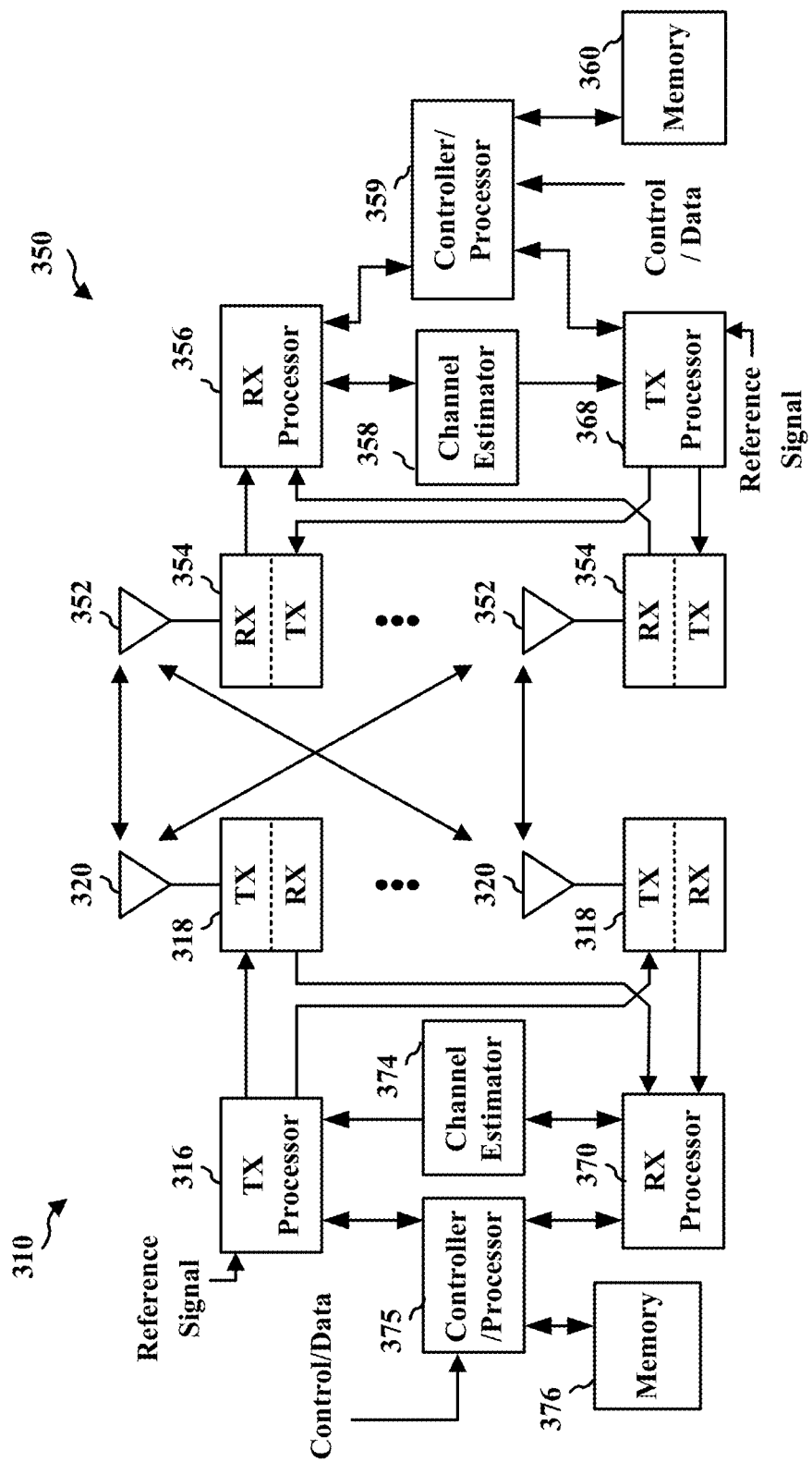
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, multiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

UEs may transmit CQI to base station so that base station may perform downlink scheduling. UEs with different SNR levels may transmit different number of CQI bits. For example, UEs that are located close to a BS may transmit a higher number of CQI bits and UEs that are located at the cell edge may transmit a lower number of CQI bits.

In one configuration, if UEs transmit a variable number of CQI bits, the modulation and coding scheme (MCS) of the CQI bits may be transmitted separately to the base station. In such a configuration, the successful decoding of CQI bits depends on the successful decoding of the MCS information. Cell edge UEs may have poor SNR and the MCS information of cell edge UEs CQI bits may experience an increased block error rate. Hence, a mechanism that allows the successful decoding of MCS information of cell edge UEs while retaining the performance for the other UEs of the cell is desirable.

Figure 4:
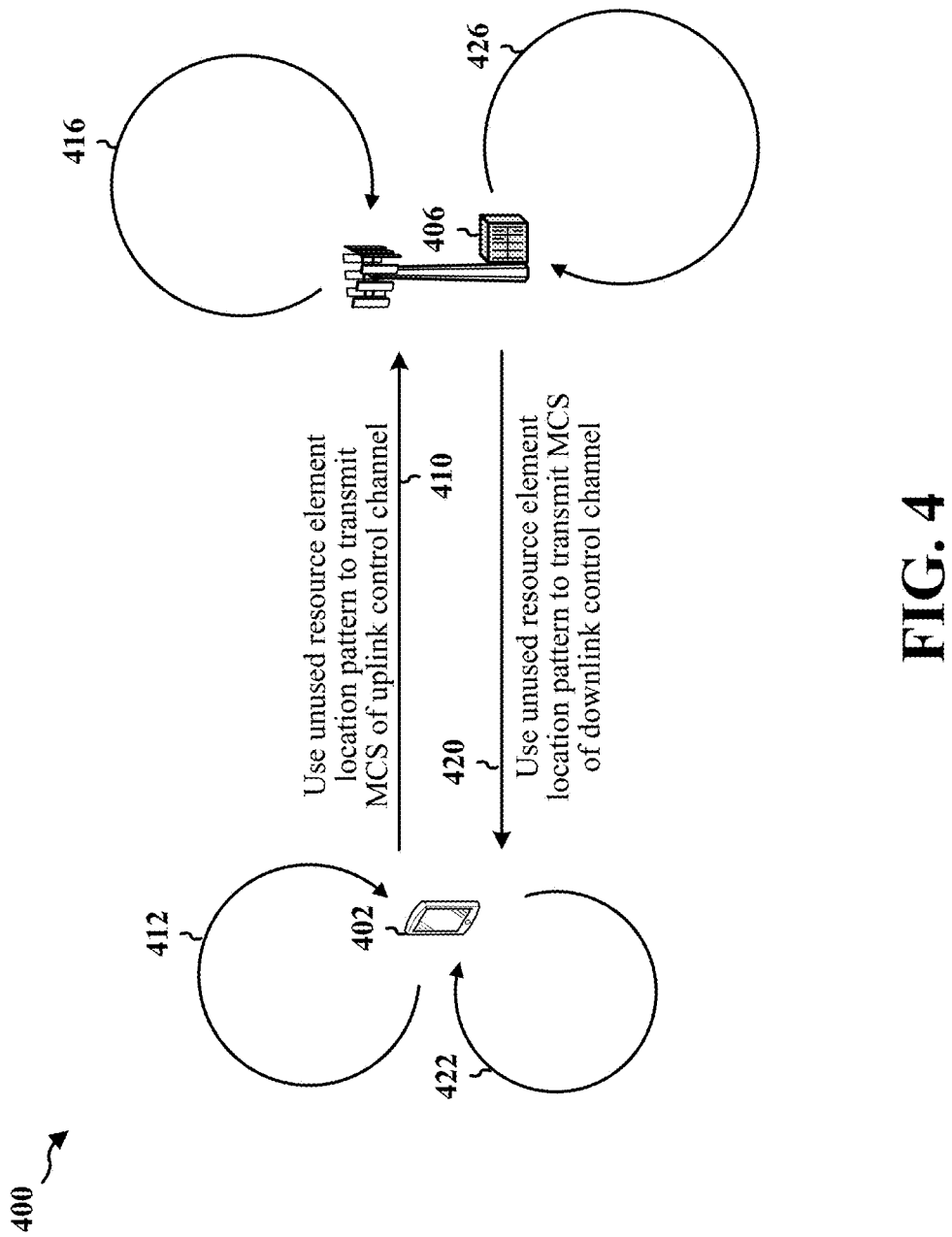
FIG. 4 is a diagram illustrating an example of using resource element location pattern to transmit MCS of uplink/downlink control channel in a wireless communication system.

FIG. 4 is a diagram illustrating an example of using a resource element location pattern to transmit the MCS of the uplink/downlink control channel in a wireless communication system 400. In this example, a UE 402 applies (at 412) a pattern of unused resource element locations in a plurality of uplink control resource elements based on the MCS of the uplink control channel. In one configuration, the MCS of uplink control channel may be determined based on the uplink signal quality from UE 402 to the base station 406. The UE 402 may use (410) the unused resource element location pattern to transmit the MCS of the uplink control channel to the base station 406. The base station 406 may determine (at 416) the MCS of the uplink control channel based on the unused resource element location pattern in the received plurality of uplink control resource elements and decode uplink control data (e.g., CQI) based on the MCS of the uplink control channel.

In one configuration, the base station 406 may apply (at 426) a pattern of unused resource element locations in one or more downlink control symbols based on the MCS of the downlink control channel. In one configuration, the MCS of the downlink control channel may be determined based on the downlink signal quality from the base station 406 to the UE 402. The base station 406 may use (420) the unused resource element location pattern to transmit the MCS of the downlink control channel to the UE 402. The UE 402 may determine (at 422) the MCS of the downlink control channel based on the unused resource element location pattern in the received downlink control symbols and decode downlink control information (e.g., downlink scheduling assignment) based on the MCS of the downlink control channel.

In one configuration, the UE 402 may be the UE 104 or 350 described above with reference to FIG. 1 or 3, respectively. In one configuration, the base station 406 may be the base station 102 or the eNB 310 described above with reference to FIG. 1 or 3, respectively.

In one configuration, a cell edge UE (e.g., UE 402) may be able to select a subset of available resource elements to form a resource element location pattern to transmit the MCS of the uplink control channel (e.g., CQI bit rate) to the base station 406. This does not affect the capacity of the CQI bits from the cell edge UE because the SNR of the cell edge UE resides in the linear regime of capacity equation. As a result, loss of degree of freedom may be offset by gain in SNR. The base station (e.g., 406) may use this resource element location pattern, along with the coherently transmitted MCS information, to find the actual MCS used by each UE to decode that UE's CQI bits.

Similarly, a base station (e.g., 406) may be able to select a subset of available resource elements to form a resource element location pattern to transmit the MCS of the downlink control channel to a UE (e.g., 402). The resource element location pattern, along with the coherently transmitted MCS information, may be used by the UE to find the actual MCS of downlink control channel for the IE.

Figure 5:
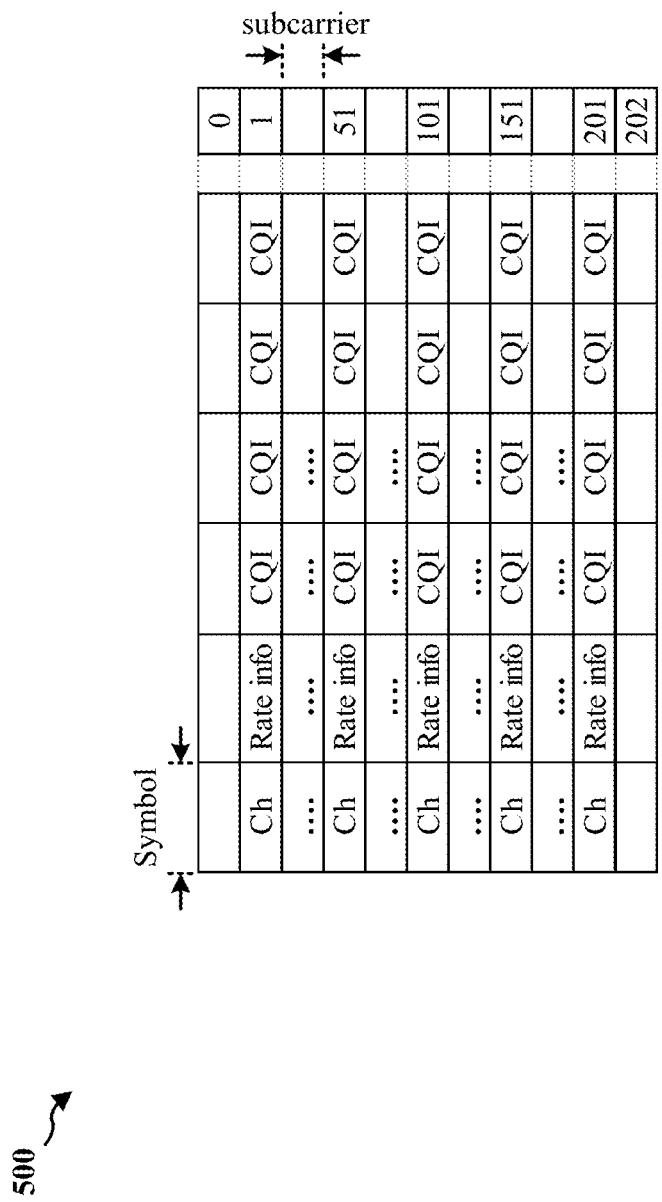
FIG. 5 is a diagram illustrating an example of CQI structure in an uplink control subframe.

FIG. 5 is a diagram illustrating an example of a CQI structure 500 in an uplink control subframe. In one configuration, the uplink control subframe may be a PUCCH subframe. In this example, the CQI structure 500 includes six symbols in the time domain and multiple subcarriers in the frequency domain. The CQI structure 500 uses an interleaved subcarrier mapping. For example, the CQI information may be presented in subcarriers 1, 51, 101, 151, and 201. The first symbol of the CQI structure 500 may transmit channel estimation pilot signals. The second symbol of the CQI structure 500 may transmit the MCS (e.g., CQI modulation and coding rate) information. In one configuration, there are four CQI levels (e.g., four CQI coding rates). In one configuration, the CQI level may be coherently transmitted using two bits in the second symbol of the CQI structure 500 (e.g., by using a two-bit Hamming code to represent a CQI level). The last four symbols of the CQI structure 500 may transmit CQI data (e.g., by using a Reed Solomon code).

Figure 6:
FIG. 6 is a table illustrates an example of possible CQI levels.

FIG. 6 is a table 600 illustrates an example of possible CQI levels. In this example, there are four possible CQI coding rates, each with a different CQI feedback amount per 2 milliseconds and a different SNR threshold with a 5% block error rate. For example, the lowest CQI coding rate (CQI coding rate No. 1) represents 4 bits of CQI feedback per 2 milliseconds, i.e., 1 bit of feedback per symbol. For the lowest CQI coding rate, in order to achieve a block error rate within 5%, the SNR needs to be 4 dB. On the other hand, the second lowest CQI coding rate (CQI coding rate No. 2) represents 8 bits of CQI feedback per 2 milliseconds, i.e., 2 bits of feedback per symbol. For the second lowest CQI coding rate, in order to achieve a block error rate less than 5%, the SNR needs to be 7 dB. This means that when the SNR is 4 dB, using two bits to transmit the CQI coding rate cannot achieve a block error rate less than 5%. Therefore, coherently transmitting the CQI coding rate using two bits per symbol may not be able to achieve less than 1% block error rate at 4 dB SNR.

Figure 7:
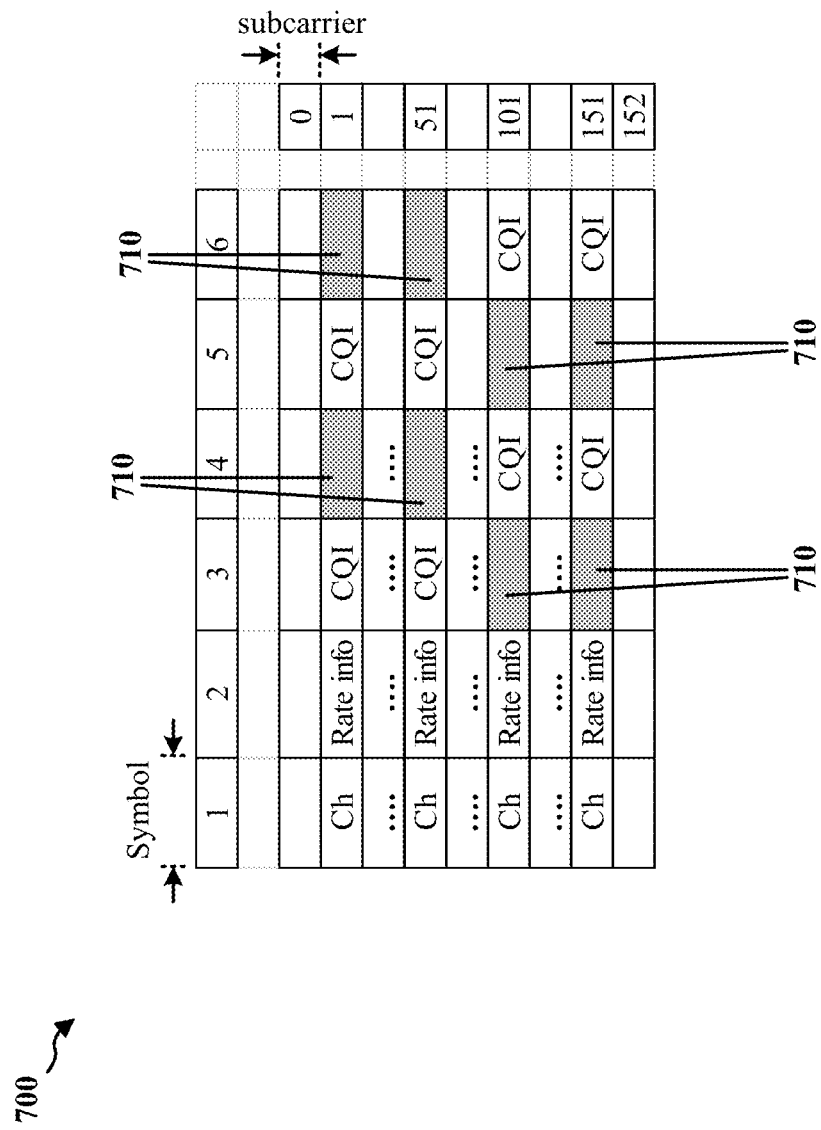
FIG. 7 is a diagram illustrating an example of CQI structure in an uplink control subframe.

FIG. 7 is a diagram illustrating an example of a CQI structure 700 in an uplink control subframe. In one configuration, the uplink control subframe may be a PUCCH subframe. In this example, the CQI structure 700 may include six symbols in the time domain and multiple subcarriers in the frequency domain. The second symbol of the CQI structure 700 transmits the CQI coding rate. In one configuration, there may be four CQI levels (e.g., four CQI coding rates) that may be transmitted in the second symbol of the CQI structure 700.

In one configuration, the lowest CQI coding rate (e.g., the CQI coding rate No. 1 described above in FIG. 6) is conveyed based on the energy in the resource elements of a fixed resource element location pattern. For example, the fixed resource element location pattern may include resource elements 710 in the CQI structure 700. In one configuration, in order to convey the lowest CQI coding rate, all resource elements 710 in the fixed resource element location pattern remain unused. At the receiving side, in one configuration, the base station (e.g., 406) may measure the energy of each resource element of the plurality of resource elements 710 in the fixed resource element location pattern, and determine whether the sum of the measured energy of each resource element of the plurality of resource elements 710 is less than a pre-determined threshold. If the sum of the measured energy of each resource element of the plurality of resource elements 710 is less than the threshold, the base station recognizes that the lowest CQI coding rate is used and may decode uplink control data (e.g., CQI data) using the lowest CQI coding rate accordingly. In one configuration, the lowest CQI coding rate may be used when the SNR is around 4-6 dB. By using the fixed resource element location pattern to convey the lowest CQI coding rate, the block error rate may be less than 1%.

In one configuration, the remaining three CQI coding rate may be transmitted in the second symbol of the CQI structure 700. Because the remaining three CQI coding rates correspond to SNRs greater than or equal to 7 dB, the block error rate remains less than 1% for transmitting the remaining three CQI coding rate.

One of ordinary skill in the art may realize that the fixed resource element location pattern may not be limited to the pattern described above in the example of FIG. 7. Instead, the fixed resource element location pattern may include another number of resource elements at different locations as long as both the sender and receiver know the fixed resource element location pattern. The fixed resource element location pattern may be used to convey another uplink control coding rate, not just the lowest CQI coding rate. In one configuration, different unused resource element location patterns may be used to convey different uplink control coding rates.

Figure 8:
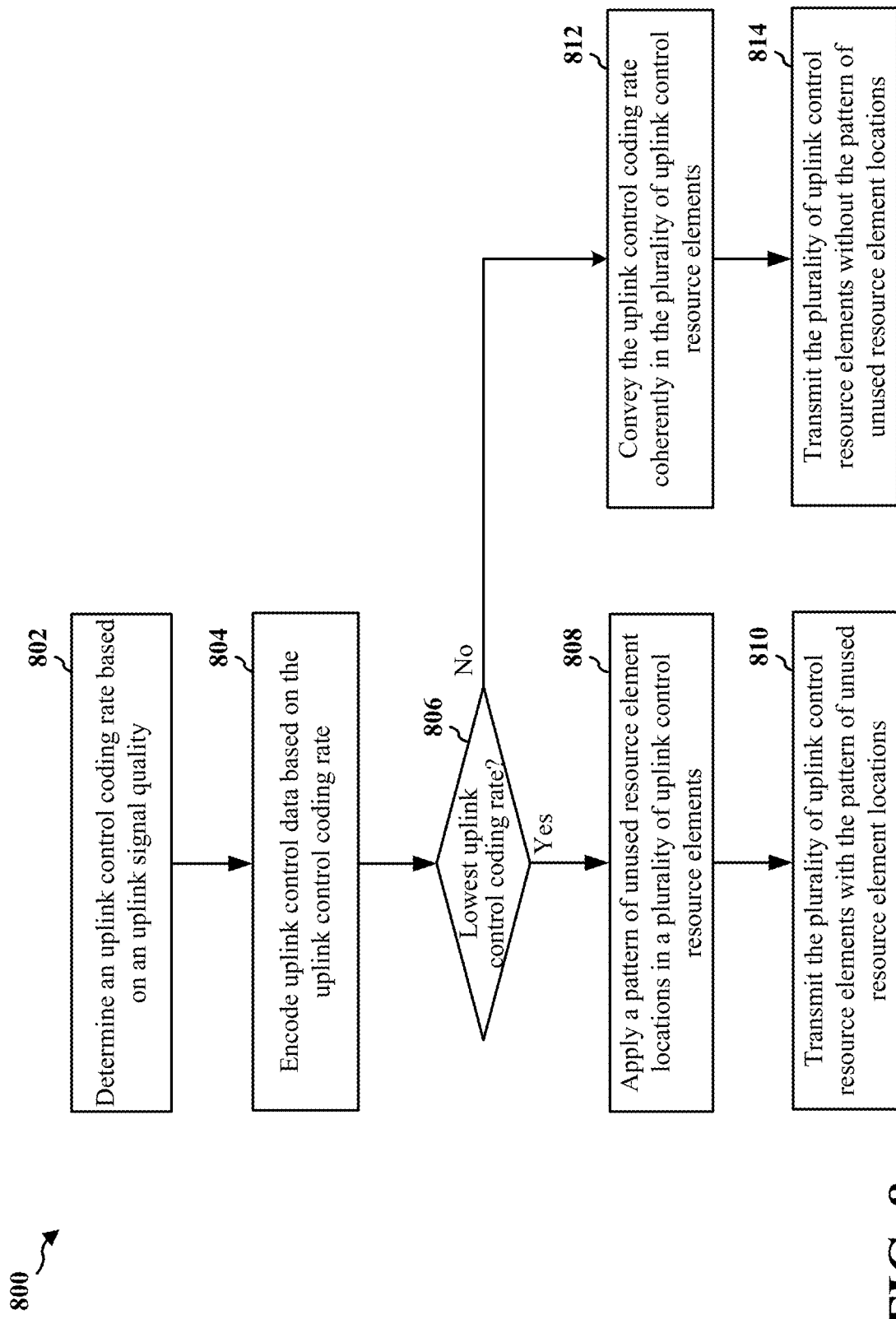
FIG. 8 is a flowchart of a method of using resource element location pattern to convey MCS of uplink control channel at the UE side.

FIG. 8 is a flowchart 800 of a method of wireless communication. Specifically, the flowchart 800 illustrates a method of using a resource element location pattern to convey the MCS of the uplink control channel at the UE side. The method may be performed by a UE (e.g., the UE 104, 350, 402, or the apparatus 1402/1402'). In one configuration, the operations described in this method may be the operations described above with reference to 412 of FIG. 4.

At 802, the UE may determine an uplink control coding rate (e.g., the MCS of the uplink control channel) based on an uplink signal quality. In one configuration, the uplink control coding rate may define the number of bits of uplink control data that is to be transmitted over a plurality of uplink control resource elements. In one configuration, the uplink control coding rate may be the CQI coding rate. In one configuration, the UE determines the uplink control coding rate based on the SNR.

At 804, the UE encodes uplink control data based on the uplink control coding rate. In one configuration, the uplink control data may be CQI data.

At 806, the UE determines whether the uplink control coding rate is the lowest control coding rate. In one configuration, the lowest control coding rate may be the CQI coding rate No. 1 described above in FIG. 6. If the uplink control coding rate is the lowest control coding rate, UE proceeds to 808. If the uplink control coding rate is not the lowest control coding rate, UE proceeds to 812.

At 808, the UE may apply a pattern of unused resource element locations in a plurality of uplink control resource elements. In one configuration, the pattern of unused resource element locations includes several unused resource elements located in several symbols and several subcarriers of the plurality of uplink control resource elements. In one configuration, the plurality of uplink control resource elements may be located in the PUCCH. In one configuration, the plurality of uplink control resource elements may contain the encoded uplink control data. At 810, the UE may transmit the plurality of uplink control resource elements with the pattern of unused resource element locations to a base station (e.g., 406).

At 812, the UE may convey the uplink control coding rate coherently in the plurality of uplink control resource elements. At 814, the UE may transmit the plurality of uplink control resource elements without the pattern of unused resource element locations. In one configuration, the uplink control coding rate may be conveyed based on a combination of a pattern of unused resource elements and coherent transmission of several used resource elements.

Figure 9:
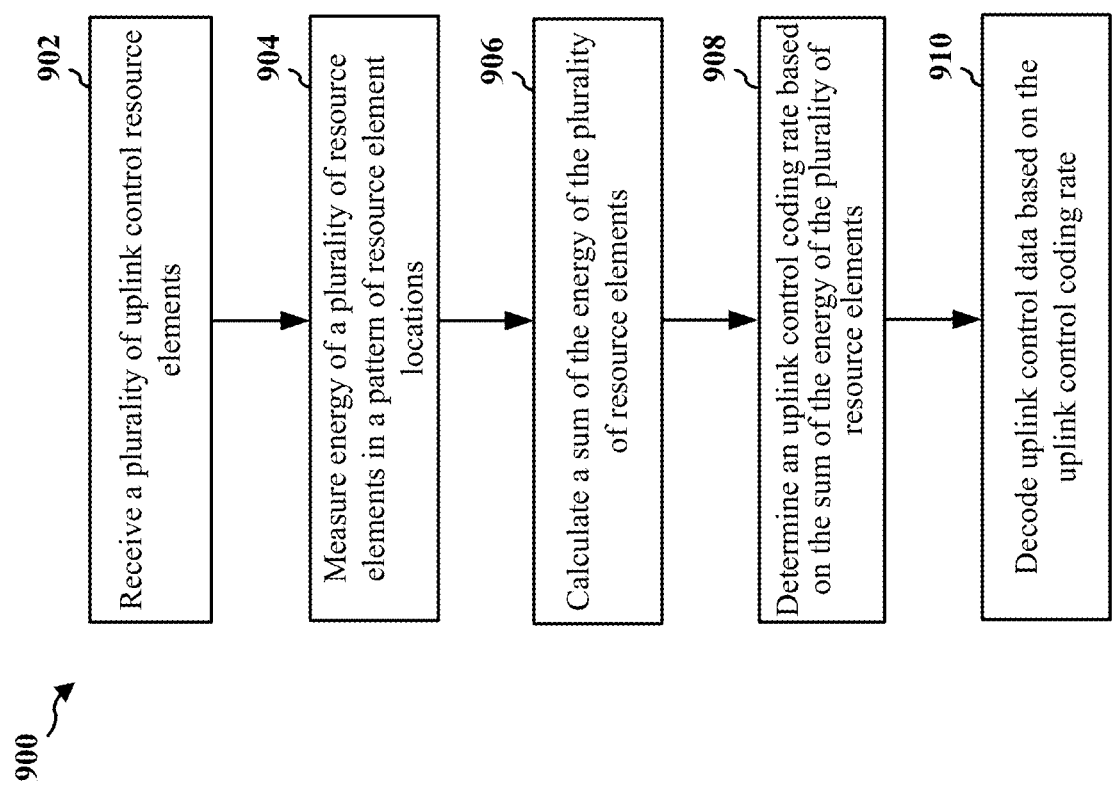
FIG. 9 is a flowchart of a method of using resource element location pattern to convey MCS of uplink control channel at the base station side.

FIG. 9 is a flowchart 900 of a method of wireless communication. Specifically, the flowchart 900 illustrates a method of using a resource element location pattern to convey the MCS of the uplink control channel at the base station side. The method may be performed by a base station (e.g., the base station 102, 406, the eNB 310, or the apparatus 1602/1602'). In one configuration, the operations described in this method may be the operations described above with reference to 416 of FIG. 4.

At 902, the base station may receive a plurality of uplink control resource elements. In one configuration, the plurality of uplink control resource elements may be located in the PUCCH. In one configuration, the plurality of uplink control resource elements may contain uplink control data.

At 904, the base station may measure the energy of each resource element of a plurality of resource elements in a pattern of resource element locations. In one configuration, the pattern of unused resource element locations includes several unused resource elements located in several symbols and several subcarriers of the plurality of uplink control resource elements. At 906, the base station may calculate the sum of the measured energy of each resource element of the plurality of resource elements in the pattern of resource element locations.

At 908, the base station may determine an uplink control coding rate based on the sum of the measured energy of each resource element of the plurality of resource elements in the pattern of resource element locations. In one configuration, the base station may determine that the uplink control coding rate is the lowest uplink control coding rate (e.g., the CQI coding rate No. 1 described above in FIG. 6) when the sum of the measured energy of each resource element of the plurality of resource elements in the pattern of resource element locations is less than a threshold. In one configuration, the base station may determine the uplink control coding rate based on information transmitted coherently in the uplink control coding rate symbol when the sum of the measured energy of each resource element of the plurality of resource elements in the pattern of resource element locations is greater than or equal to the threshold.

In one configuration, the uplink control coding rate may be the MCS of the uplink control channel. In one configuration, the uplink control coding rate may define the number of bits of uplink control data that is to be transmitted over the plurality of uplink control resource elements. In one configuration, the uplink control coding rate may be determined based on a log likelihood ratio collected from one or more coherently transmitted resource element locations. In one configuration, the uplink control coding rate may be determined based on a log likelihood ratio collected from both a pattern of unused resource element locations and coherently transmitted resource element locations.

At 910, the base station may decode uplink control data based on the uplink control coding rate. In one configuration, the uplink control coding rate may be the CQI coding rate and the control data may be CQI data.

Figure 10:
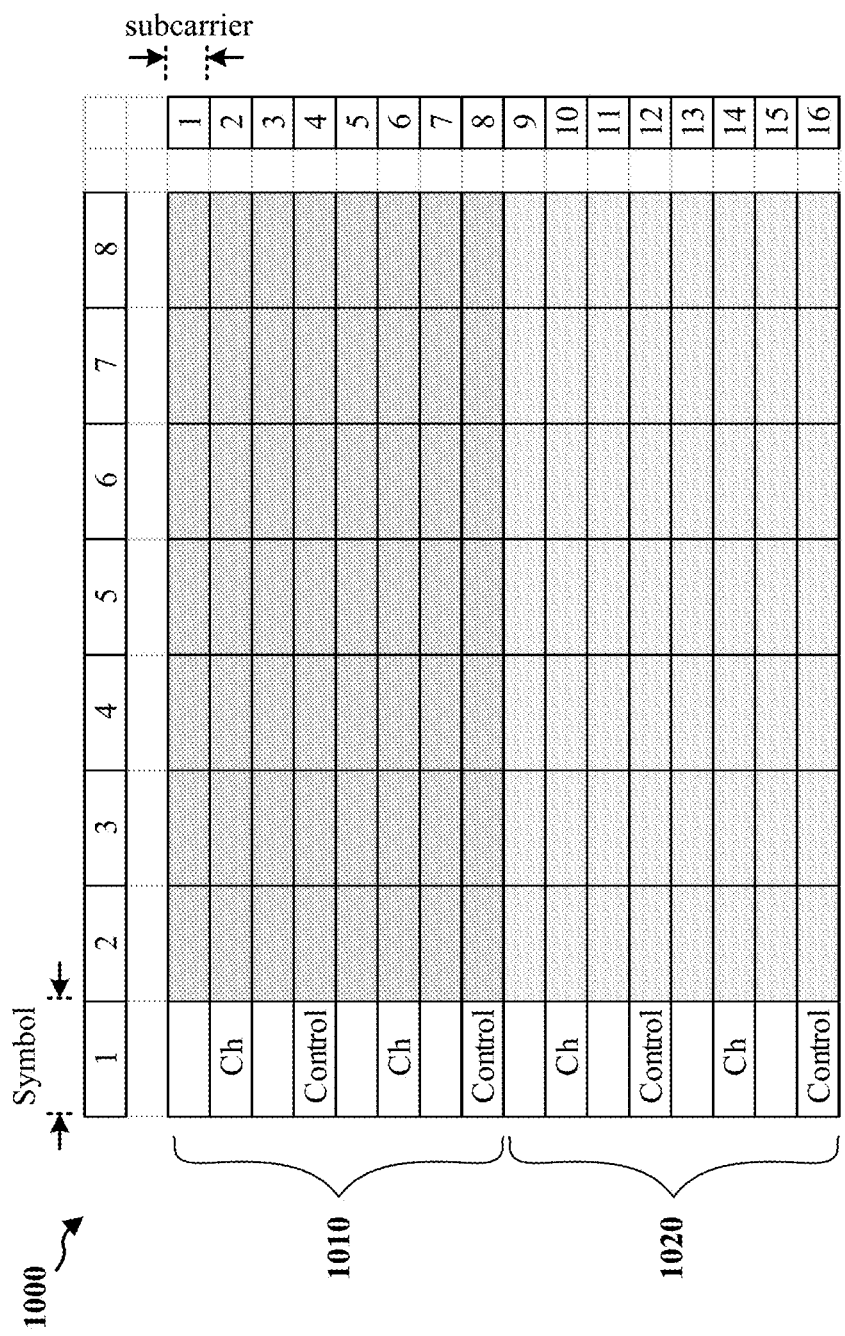
FIG. 10 is a diagram illustrating an example of resource block in a downlink control subframe.

FIG. 10 is a diagram illustrating an example of a resource block 1000 in a downlink control subframe. In one configuration, the downlink control subframe may be a PDCCH subframe. In this example, the resource block 1000 may include eight symbols in the time domain and multiple (e.g., 16) subcarriers in the frequency domain. The number of subcarriers may vary according to the available bandwidth. The resource block 1000 may be divided into two portions 1010 and 1020. The resource elements in portion 1020 may be used for transmitting data for a first UE and the resource elements in portion 1010 may be used for transmitting data for a second UE.

The resource block 1000 may have a common control symbol (e.g., the first symbol) and channel estimation pilots for both the first UE and the second UE. In one configuration, null (unused) resource elements (e.g., blank resource elements that are neither labeled nor filled with pattern) in the resource block 1000 are used to generate periodicity of control symbol in time domain. Such a configuration may allow the UE to estimate and mitigate phase noise.

In one configuration, the first UE and the second UE may have different SNRs. As a result, the coding rate of the control symbol may be sufficient for the first UE but too high for the second UE. Therefore, an additional control symbol may be used for the second UE to improve the performance of the second UE.

Figure 11:
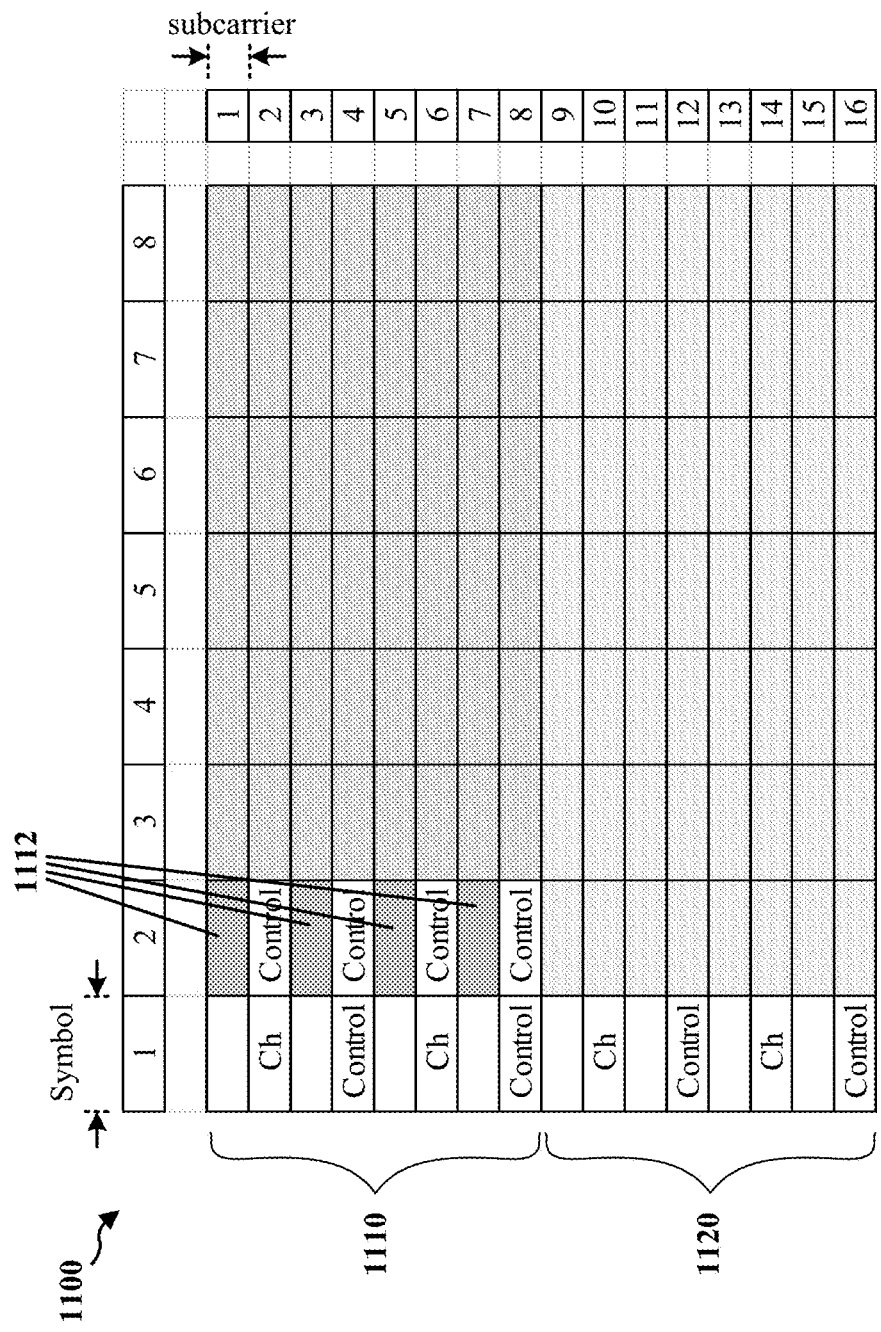
FIG. 11 is a diagram illustrating an example of resource block in a downlink control subframe.

FIG. 11 is a diagram illustrating an example of a resource block 1100 in a downlink control subframe. In one configuration, the downlink control subframe may be a PDCCH subframe. In this example, the resource block 1100 may include eight symbols in the time domain and multiple (e.g., 16) subcarriers in the frequency domain. The resource block 1100 may be divided into two portions 1110 and 1120. The resource elements in portion 1120 may be used for transmitting data for a first UE and the resource elements in portion 1110 may be used for transmitting data for a second UE.

As described above in FIG. 10, because the first UE and the second UE may have different SNRs, the coding rate of the control symbol may be sufficient for the first UE but too high for the second UE. In one configuration, to improve the performance for the second UE, a fixed pattern of null (unused) resource elements 1112 in the second symbol of the second UE may be used to inform the second UE that two symbols (e.g., the first and second symbols) are used for control information transmission.

At the receiving side, in one configuration, the UE (e.g., 402) may measure the energy of each resource element of the plurality of resource elements 1112 in the fixed resource element location pattern, and determine whether the sum of the measured energy of each resource element of the plurality of resource elements 1112 is less than a pre-determined threshold. If the sum of the measured energy of each resource element of the plurality of resource elements 1112 is less than the threshold, the UE recognizes that two symbols are used for control information transmission and may decode downlink control data (e.g., downlink scheduling assignment) accordingly. If the sum of the measured energy of each resource element of the plurality of resource elements 1112 is greater than or equal to the threshold, the UE recognizes that one symbol is used for control information transmission and may decode downlink control data (e.g., downlink scheduling assignment) accordingly.

One of ordinary skill in the art may realize that the fixed resource element location pattern may not be limited to the pattern described above in the example of FIG. 11. Instead, the fixed resource element location pattern may include any number of resource elements of one or more control symbols as long as both the sender and receiver know the fixed pattern. The fixed resource element location pattern may be used to convey any downlink control MCS, not just how many control symbols are used for control information transmission. In one configuration, different unused resource element location patterns may be used to convey different downlink control MCSs.

Figure 12:
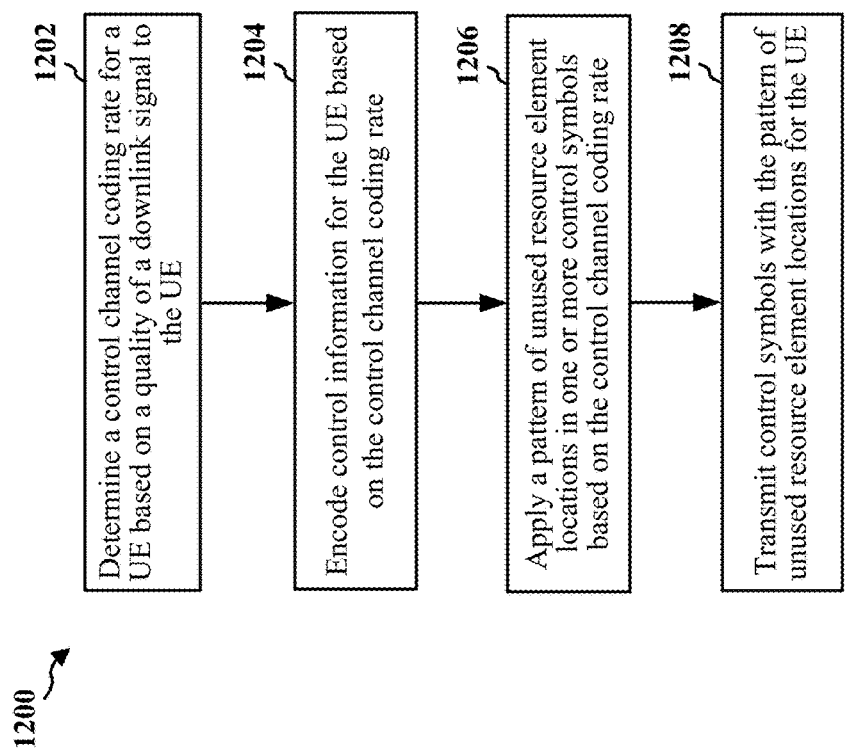
FIG. 12 is a flowchart of a method of using resource element location pattern to convey MCS of downlink control channel at the base station side.

FIG. 12 is a flowchart 1200 of a method of wireless communication. Specifically, the flowchart 1200 illustrates a method of using a resource element location pattern to convey the MCS of a downlink control channel at the base station side. The method may be performed by a base station (e.g., the base station 102, 406, the eNB 310, or the apparatus 1602/1602'). In one configuration, the operations described in this method may be the operations described above with reference to 426 of FIG. 4.

At 1202, the base station determines a downlink control channel coding rate (e.g., a MCS of a downlink control channel) for a UE (e.g., 402) based on a quality of a downlink signal to the UE. In one configuration, the downlink control channel coding rate may define the number of bits of control information that is to be transmitted over a downlink resource block. In one configuration, the base station determines the downlink control channel coding rate based on the SNR. In one configuration, the downlink resource block may be within a PDCCH subframe.

At 1204, the base station encodes control information for the UE based on the downlink control channel coding rate. In one configuration, the control information may include a downlink scheduling assignment to the UE. In one configuration, the first symbol and the second symbol of the downlink resource block may contain the encoded control information for the UE.

At 1206, the base station applies a pattern of unused resource element locations in one or more control symbols based on the downlink control channel coding rate. In one configuration, the pattern of unused resource element locations includes several unused resource elements located in the second symbol of the downlink resource block. In one configuration, the pattern of unused resource element locations is applied in the second symbol if the determined downlink control channel coding rate for the UE is below a downlink control channel coding rate for transmitting control information to the UE that uses one symbol of the downlink resource block. In one configuration, the pattern of unused resource element locations is not applied if the determined downlink control channel coding rate for the UE allows the control information of the UE to be transmitted with one symbol of the downlink resource block.

At 1208, the base station transmits control symbols with the pattern of unused resource element locations for the UE. In one configuration, the control symbols and the pattern of unused resource element locations may be within a PDCCH subframe. In one configuration, the downlink control channel coding rate may be conveyed based on a combination of a pattern of unused resource elements and coherent transmission of one or more used resource elements.

Figure 13:
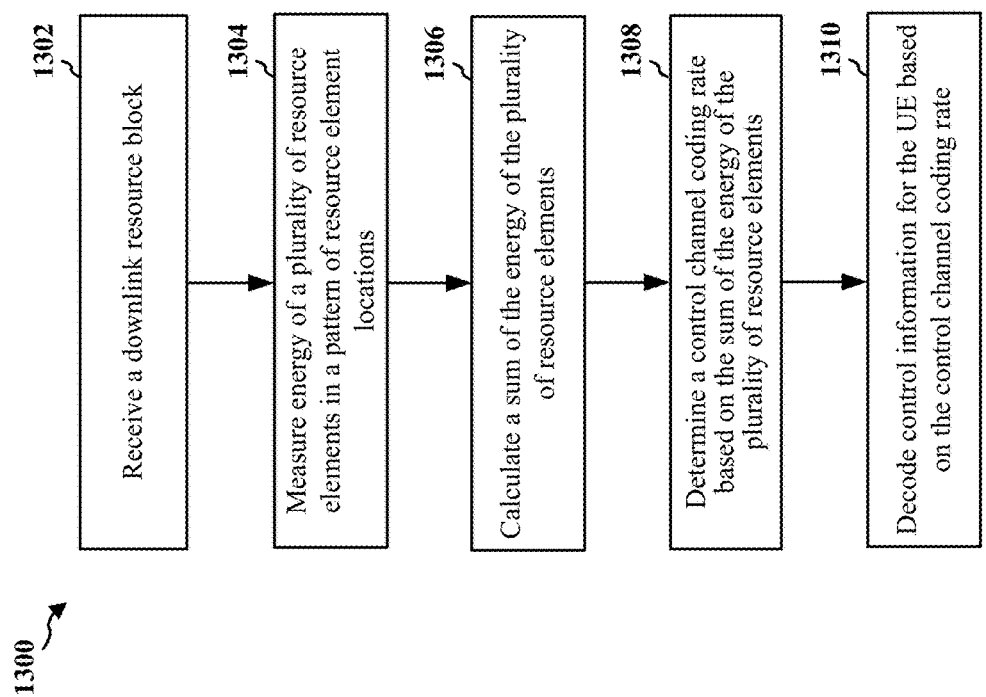
FIG. 13 is a flowchart of a method of using resource element location pattern to convey MCS of downlink control channel at the UE side.

FIG. 13 is a flowchart 1300 of a method of wireless communication. Specifically, the flowchart 1300 illustrates a method of using a resource element location pattern to convey the MCS of a downlink control channel at the UE side. The method may be performed by a UE (e.g., the UE 104, 350, 402, or the apparatus 1402/1402'). In one configuration, the operations described in this method may be the operations described above with reference to 422 of FIG. 4.

At 1302, the UE receives a downlink resource block. In one configuration, the downlink resource block may be within a PDCCH subframe. In one configuration, the downlink resource block may contain downlink control data.

At 1304, the UE may measures the energy of each resource element of a plurality of resource elements in a pattern of resource element locations. In one configuration, the pattern of unused resource element locations may include several unused resource elements located in one or more symbols of the downlink resource block. In one configuration, the pattern of resource element locations may include several resource elements located in the second symbol of the downlink resource block. At 1306, the UE may calculate the sum of the measured energy of each resource element of the plurality of resource elements in the pattern of resource element locations.

At 1308, the UE determines a downlink control channel coding rate based on the sum of the energy of the resource elements in the pattern of resource element locations. In one configuration, the downlink control channel coding rate may determine the number of symbols of the downlink resource block that is to be used for conveying the control information for the UE. In one configuration, the base station may determine that the downlink control channel coding rate is a control channel coding rate that uses two symbols of the downlink resource block for conveying the control information for the UE when the sum of the energy of the resource elements in the pattern of resource element locations is less than a threshold. In one configuration, the base station may determine the downlink control channel coding rate is a control channel coding rate that uses one symbol of the downlink resource block for conveying the control information for the UE when the sum of the energy of the resource elements in the pattern of resource element locations is greater than or equal to the threshold.

In one configuration, the downlink control channel coding rate may be the MCS of the downlink control channel. In one configuration, the downlink control channel coding rate may define the number of bits of control data that is to be transmitted over the downlink resource block. In one configuration, the downlink control channel coding rate may be determined based on a log likelihood ratio collected from one or more coherently transmitted resource element locations. In one configuration, the downlink control channel coding rate may be determined based on a log likelihood ratio collected from both a pattern of unused resource element locations and coherently transmitted resource element locations.

At 1310, the UE decodes downlink control information (e.g., downlink scheduling assignment) for the UE based on the downlink control channel coding rate. In one configuration, the downlink control information may be contained in the downlink resource block.

Figure 14:
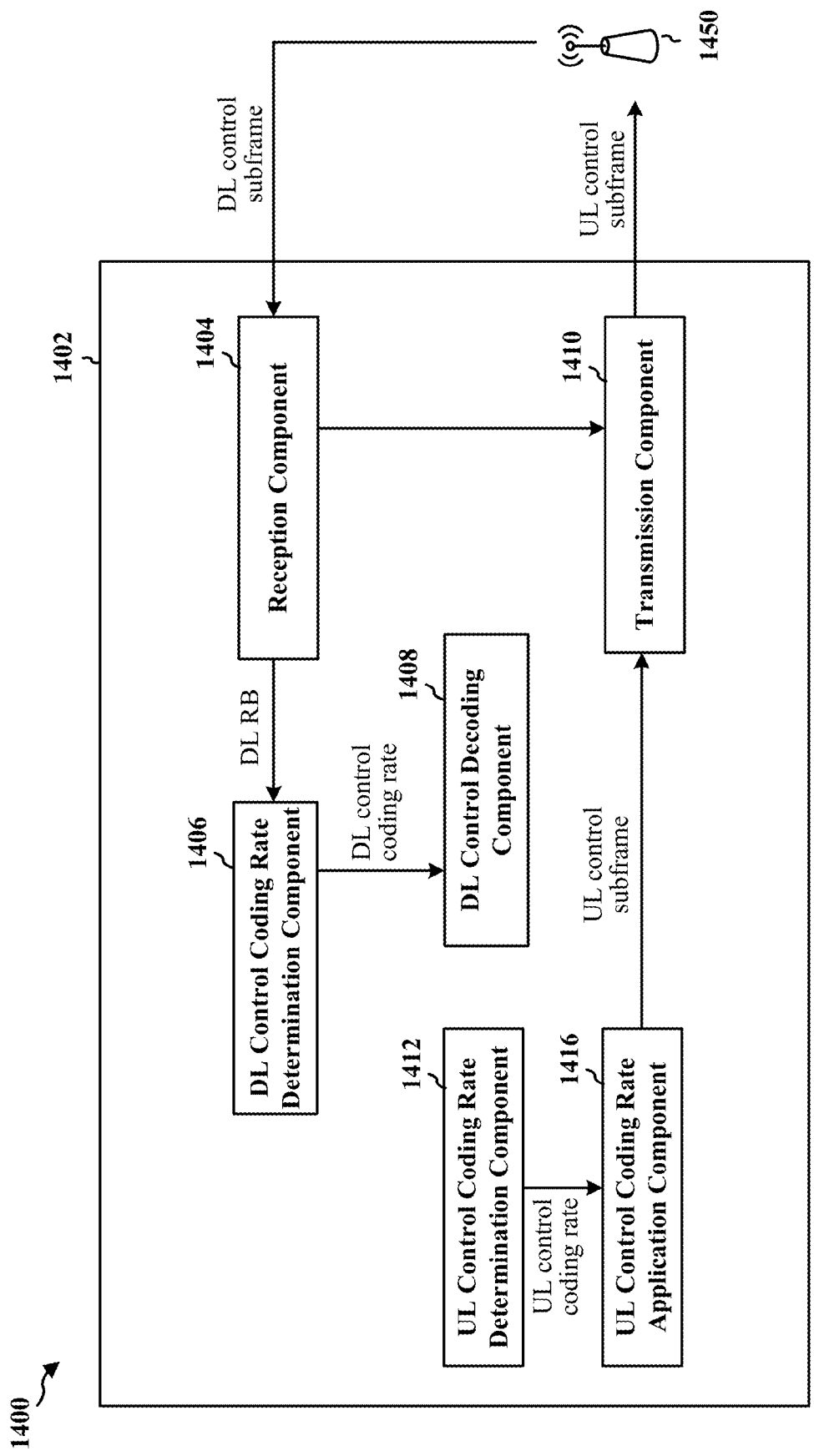
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a UE. The apparatus 1402 includes a reception component 1404 that receives downlink control subframe from a base station 1450. In one configuration, the base station 1450 may be the base station 406 described above with reference to FIG. 4. In one configuration, the reception component 1404 may perform operations described above with reference to 1302 of FIG. 13.

The apparatus 1402 includes a transmission component 1410 that sends uplink control subframe to the base station 1450. In one configuration, the transmission component 1410 may perform operations described above with reference to 810 or 814 of FIG. 8. In one configuration, the reception component 1404 and the transmission component 1410 may work together to coordinate the communication of the apparatus 1402.

The apparatus 1402 may include a downlink control coding rate determination component 1406 that determines downlink control channel coding rate for the apparatus 1402 based on a downlink resource block received from the reception component 1404. The downlink resource block may be contained in the downlink control subframe. In one configuration, the downlink control coding rate determination component 1406 may perform operations described above with reference to 1304-1308 of FIG. 13.

The apparatus 1402 may include a downlink control decoding component 1408 that decodes control information for the apparatus 1402 based on the downlink control channel coding rate received from the downlink control coding rate determination component 1406. In one configuration, the downlink control decoding component 1408 may perform operations described above with reference to 1310 of FIG. 13.

The apparatus 1402 may include an uplink control coding rate determination component 1412 that determines uplink control channel coding rate for the apparatus 1402 based on an uplink signal quality. In one configuration, the uplink control coding rate determination component 1412 may perform operations described above with reference to 802 of FIG. 8.

The apparatus 1402 may include an uplink control coding rate application component 1416 that encodes uplink control information based on the uplink control channel coding rate received from the uplink control coding rate determination component 1412 and applies a pattern of unused resource element locations in a plurality of uplink control resource elements based on the uplink control channel coding rate. The uplink control coding rate application component 1416 then sends the plurality of uplink control resource elements to the transmission component 1410 for transmission to the base station 1450. In one configuration, the uplink control coding rate application component 1416 may perform operations described above with reference to 804, 806, 808, or 812 of FIG. 8.

The apparatus may include additional components that perform each of the blocks of the algorithm in the aforementioned flowcharts of FIGS. 8 and 13. As such, each block in the aforementioned flowcharts of FIGS. 8 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
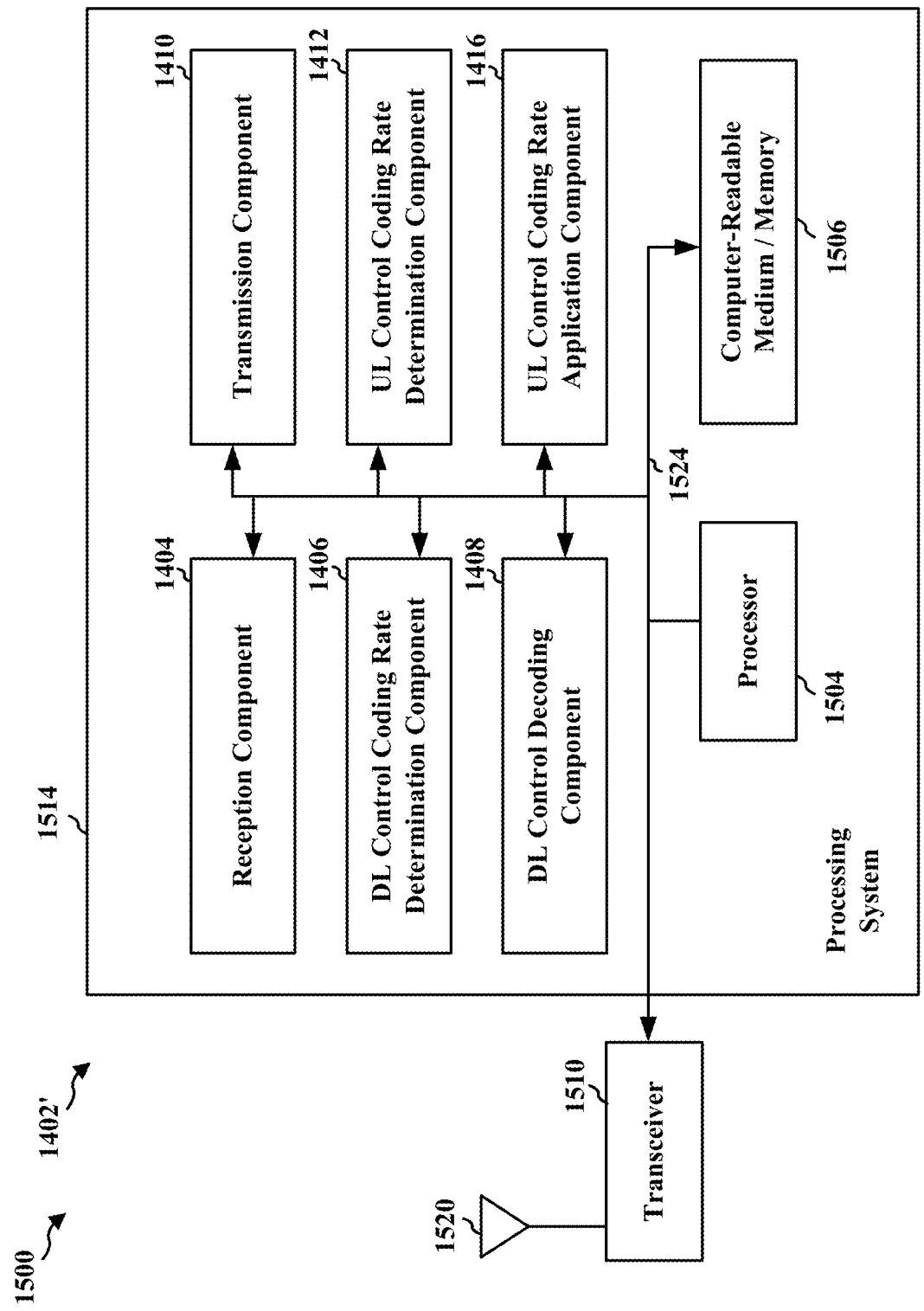
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1416, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1416. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication includes means for determining an uplink control coding rate based on an uplink signal quality. In one configuration, the means for determining an uplink control coding rate based on an uplink signal quality may perform operations described above with reference to 802 of FIG. 8. In one configuration, the means for determining an uplink control coding rate based on an uplink signal quality may be the uplink control coding rate determination component 1412 or the processor 1504.

In one configuration, the apparatus 1402/1402' may include means for applying a pattern of unused resource element locations in a plurality of uplink control resource elements based on the uplink control coding rate. In one configuration, the means for applying a pattern of unused resource element locations in a plurality of uplink control resource elements based on the uplink control coding rate may perform operations described above with reference to 804, 806, 808, or 812 of FIG. 8. In one configuration, the means for applying a pattern of unused resource element locations in a plurality of uplink control resource elements based on the uplink control coding rate may be the uplink control coding rate application component 1416 or the processor 1504. In one configuration, the means for applying the pattern of unused resource element locations based on the uplink control coding rate is configured to apply the pattern of unused resource element locations when the uplink control coding rate is a lowest uplink control coding rate.

In one configuration, the apparatus 1402/1402' may include means for transmitting the plurality of uplink control resource elements with the pattern of unused resource element locations. In one configuration, the means for transmitting the plurality of uplink control resource elements with the pattern of unused resource element locations may perform operations described above with reference to 810 of FIG. 8. In one configuration, the means for transmitting the plurality of uplink control resource elements with the pattern of unused resource element locations may be the transceiver 1510, the one or more antennas 1520, the transmission component 1410, or the processor 1504.

In one configuration, the apparatus 1402/1402' may include means for encoding uplink control data based on the uplink control coding rate. In one configuration, the means for encoding uplink control data based on the uplink control coding rate may perform operations described above with reference to 804 of FIG. 8. In one configuration, the means for encoding uplink control data based on the uplink control coding rate may be the uplink control coding rate application component 1416 or the processor 1504.

In one configuration, the apparatus 1402/1402' may include means for receiving a downlink resource block. In one configuration, the means for receiving a downlink resource block may perform operations described above with reference to 1302 of FIG. 13. In one configuration, the means for receiving a downlink resource block may be the transceiver 1510, the one or more antennas 1520, the reception component 1404, or the processor 1504.

In one configuration, the apparatus 1402/1402' may include means for determining a control channel coding rate based on a pattern of resource element locations in the downlink resource block. In one configuration, the means for determining a control channel coding rate based on a pattern of resource element locations in the downlink resource block may perform operations described above with reference to 1304-1308 of FIG. 13. In one configuration, the means for determining a control channel coding rate based on a pattern of resource element locations in the downlink resource block may be the downlink control coding rate determination component 1406 or the processor 1504.

In one configuration, the means for determining the control channel coding rate based on the pattern of resource element locations may be configured to: measure energy of the plurality of resource elements in the pattern of resource element locations; calculate a sum of the energy of the plurality of resource elements; and determine the control channel coding rate based on the sum of the energy of the plurality of resource elements. In one configuration, the means for determining the control channel coding rate based on the pattern of resource element locations may be further configured to determine that the control channel coding rate is a first control channel coding rate that uses one symbol of the downlink resource block when the sum of the energy of the plurality of resource elements is greater than or equal to a threshold. In one configuration, the means for determining the control channel coding rate based on the pattern of resource element locations may be further configured to determine that the control channel coding rate is a second control channel coding rate that uses two symbols of the downlink resource block when the sum of the energy of the plurality of resource elements is less than the threshold.

In one configuration, the apparatus 1402/1402' may include means for decoding control information for the UE based on the control channel coding rate. In one configuration, the means for decoding control information for the UE based on the control channel coding rate may perform operations described above with reference to 1310 of FIG. 13. In one configuration, the means for decoding control information for the UE based on the control channel coding rate may be the downlink control decoding component 1408 or the processor 1504.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
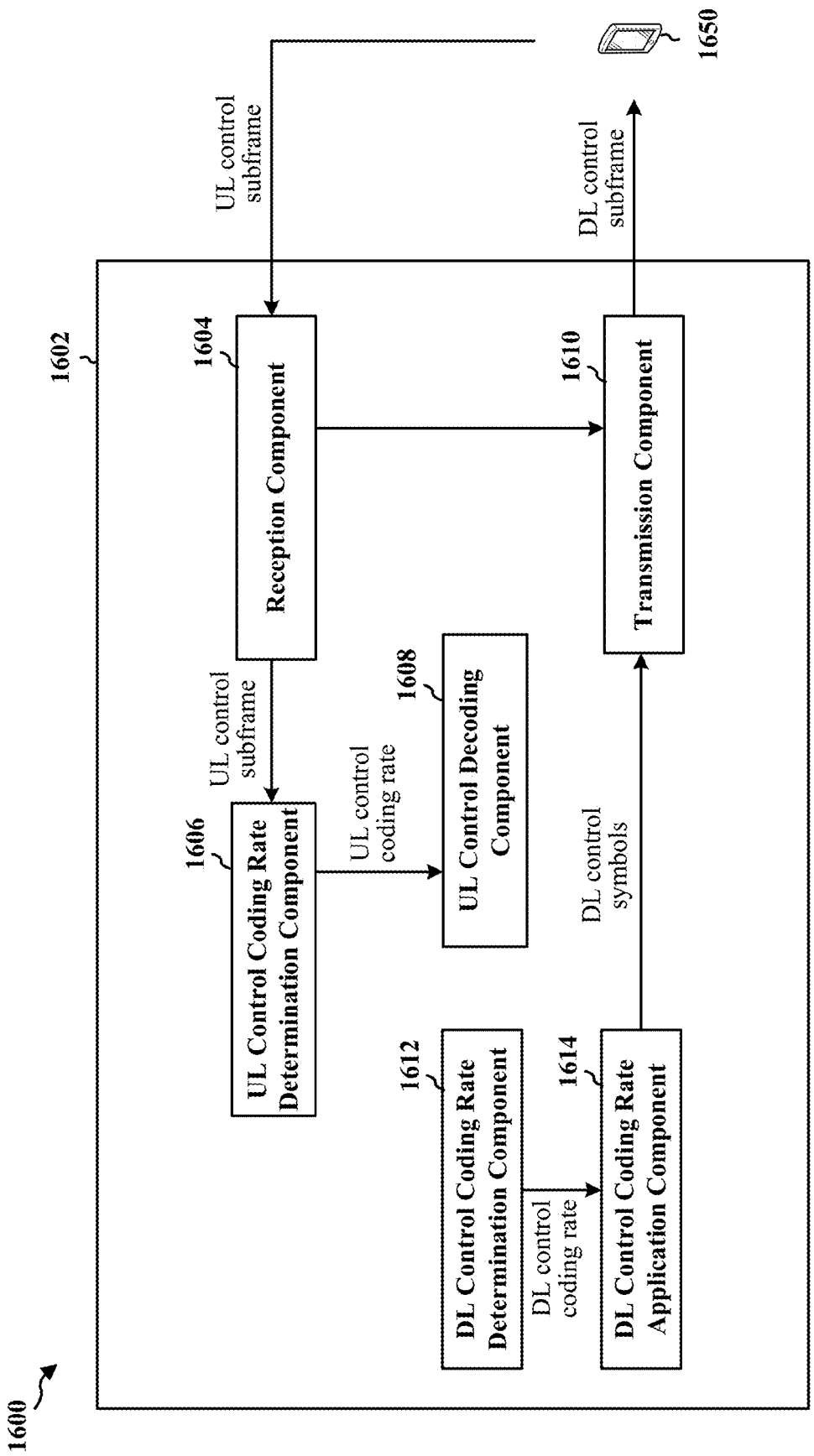
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a base station. The apparatus 1602 includes a reception component 1604 that receives a plurality of uplink control resource elements from a UE 1650. In one configuration, the UE 1650 may be the UE 402 described above with reference to FIG. 4. In one configuration, the reception component 1604 may perform operations described above with reference to 902 of FIG. 9.

The apparatus 1602 includes a transmission component 1610 that sends downlink control subframe to the UE 1650. In one configuration, the transmission component 1610 may perform operations described above with reference to 1208 of FIG. 12. In one configuration, the reception component 1604 and the transmission component 1610 may work together to coordinate the communication of the apparatus 1602.

The apparatus 1602 may include an uplink control coding rate determination component 1606 that determines uplink control channel coding rate for the apparatus 1602 based on a plurality of uplink control resource elements received from the reception component 1604. In one configuration, the uplink control coding rate determination component 1606 may perform operations described above with reference to 904-908 of FIG. 9.

The apparatus 1602 may include an uplink control decoding component 1608 that decodes control information based on the uplink control channel coding rate received from the uplink control coding rate determination component 1606. In one configuration, the uplink control decoding component 1608 may perform operations described above with reference to 910 of FIG. 9.

The apparatus 1602 may include a downlink control coding rate determination component 1612 that determines downlink control channel coding rate for the UE 1650 based on the downlink signal quality to the UE 1650. In one configuration, the downlink control coding rate determination component 1612 may perform operations described above with reference to 1202 of FIG. 12.

The apparatus 1602 may include a downlink control coding rate application component 1614 that encodes downlink control information based on the downlink control channel coding rate received from the downlink control coding rate determination component 1612 and applies a pattern of unused resource element locations in one or more control symbols based on the downlink control channel coding rate. The downlink control coding rate application component 1614 then sends the downlink control symbols to the transmission component 1610 for transmission to the UE 1650 in a downlink control subframe. In one configuration, the downlink control coding rate application component 1614 may perform operations described above with reference to 1204 or 1206 of FIG. 12.

The apparatus may include additional components that perform each of the blocks of the algorithm in the aforementioned flowcharts of FIGS. 9 and 12. As such, each block in the aforementioned flowcharts of FIGS. 9 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
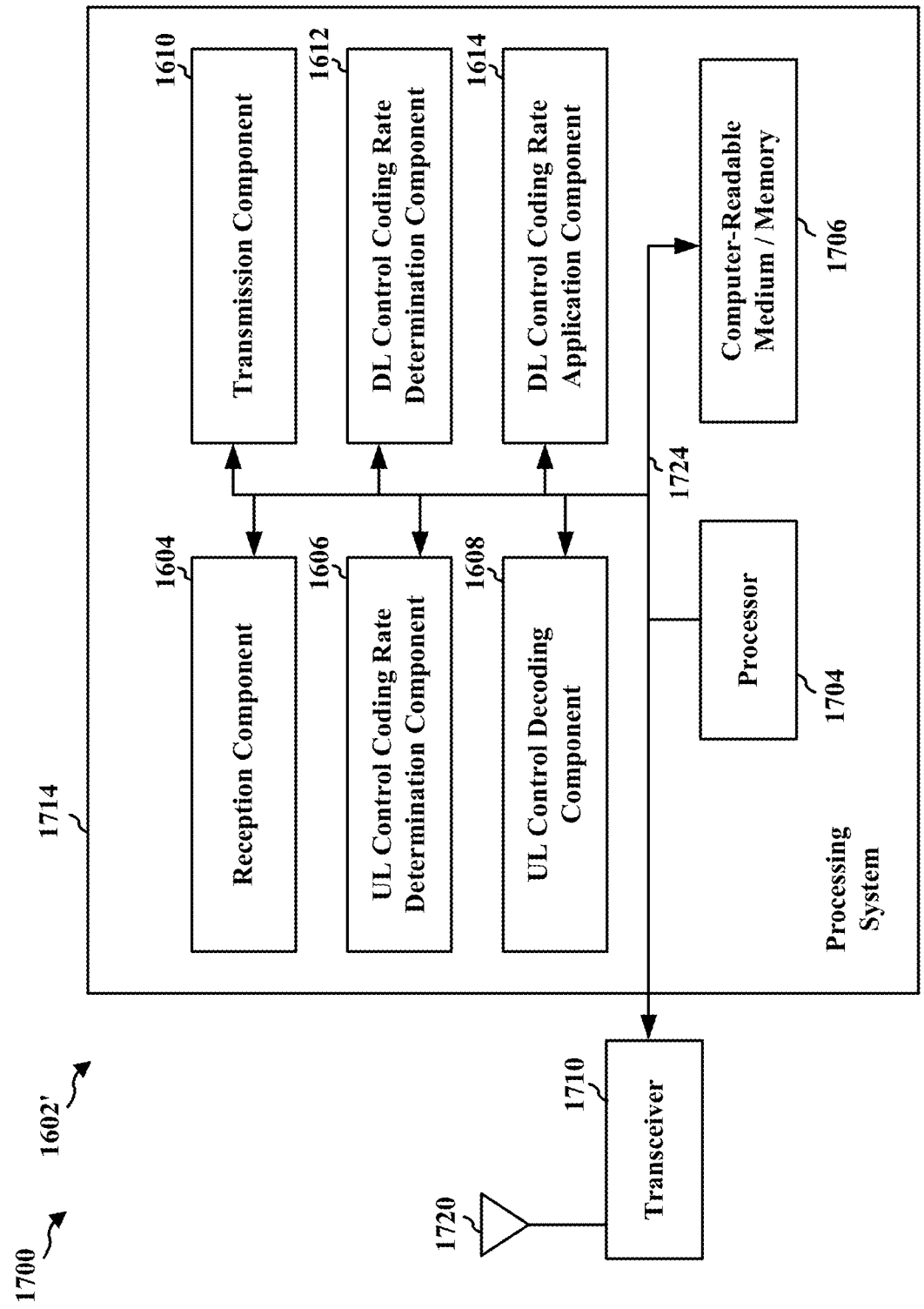
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1610, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614. The components may be software components running in the processor 1704, resident/stored in the computer readable medium/memory 1706, one or more hardware components coupled to the processor 1704, or some combination thereof. The processing system 1714 may be a component of the eNB 310 and may include the memory 376 and/or at least one of the TX processor 316, the RX processor 370, and the controller/processor 375.

In one configuration, the apparatus 1602/1602' for wireless communication includes means for receiving a plurality of uplink control resource elements. In one configuration, the means for receiving a plurality of uplink control resource elements may perform operations described above with reference to 902 of FIG. 9. In one configuration, the means for receiving a plurality of uplink control resource elements may be the transceiver 1710, the one or more antennas 1720, the reception component 1604, or the processor 1704.

In one configuration, the apparatus 1602/1602' may include means for determining an uplink control coding rate based on a pattern of resource element locations in the plurality of uplink control resource elements. In one configuration, the means for determining an uplink control coding rate based on a pattern of resource element locations in the plurality of uplink control resource elements may perform operations described above with reference to 904-908 of FIG. 9. In one configuration, the means for determining an uplink control coding rate based on a pattern of resource element locations in the plurality of uplink control resource elements may be the uplink control coding rate determination component 1606 or the processor 1704.

In one configuration, the means for determining the uplink control coding rate based on the pattern of resource element locations may be configured to: measure energy of a plurality of resource elements in the pattern of resource element locations; calculate a sum of the energy of the plurality of resource elements; and determine the uplink control coding rate based on the sum of the energy of the plurality of resource elements. In one configuration, to determine the uplink control coding rate based on the sum of the energy of the plurality of resource elements, the means for determining the uplink control coding rate may be further configured to determine that the uplink control coding rate is the lowest uplink control coding rate when the sum of the energy of the plurality of resource elements is less than a threshold. In one configuration, to determine the uplink control coding rate based on the pattern of resource element locations, the means for determining the uplink control coding rate is further configured to determine the uplink control coding rate based on information transmitted coherently in the plurality of uplink control resource elements when the sum of the energy of the plurality of resource elements is greater than or equal to the threshold.

In one configuration, the apparatus 1602/1602' may include means for decoding uplink control data based on the uplink control coding rate. In one configuration, the means for decoding uplink control data based on the uplink control coding rate may perform operations described above with reference to 910 of FIG. 9. In one configuration, the means for decoding uplink control data based on the uplink control coding rate may be the uplink control decoding component 1608 or the processor 1704.

In one configuration, the apparatus 1602/1602' may include means for determining a control channel coding rate for a UE based on a quality of a downlink signal to the UE. In one configuration, the means for determining a control channel coding rate for a UE based on a quality of a downlink signal to the UE may perform operations described above with reference to 1202 of FIG. 12. In one configuration, the means for determining a control channel coding rate for a UE based on a quality of a downlink signal to the UE may be the downlink control coding rate determination component 1612 or the processor 1704.

In one configuration, the apparatus 1602/1602' may include means for applying a pattern of unused resource element locations in one or more control symbols based on the control channel coding rate. In one configuration, the means for applying a pattern of unused resource element locations in one or more control symbols based on the control channel coding rate may perform operations described above with reference to 1204 or 1206 of FIG. 12. In one configuration, the means for applying a pattern of unused resource element locations in one or more control symbols based on the control channel coding rate may be the downlink control coding rate application component 1614 or the processor 1704.

In one configuration, the apparatus 1602/1602' may include means for transmitting control symbols with the pattern of unused resource element locations for the UE. In one configuration, the means for transmitting control symbols with the pattern of unused resource element locations for the UE may perform operations described above with reference to 1208 of FIG. 12. In one configuration, the means for transmitting control symbols with the pattern of unused resource element locations for the UE may be the transceiver 1710, the one or more antennas 1720, the transmission component 1610, or the processor 1704.

In one configuration, the apparatus 1602/1602' may include means for encoding control information for the UE based on the control channel coding rate. In one configuration, the means for encoding control information for the UE based on the control channel coding rate may perform operations described above with reference to 1204 of FIG. 12. In one configuration, the means for encoding control information for the UE based on the control channel coding rate may be the downlink control coding rate application component 1614 or the processor 1704.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining an uplink control coding rate based on an uplink signal quality;
   applying a pattern of unused resource element locations in a plurality of uplink control resource elements based on the uplink control coding rate, wherein the pattern of unused resource element locations comprises a plurality of unused resource elements located in a plurality of symbols and a plurality of subcarriers; and
   transmitting the plurality of uplink control resource elements with the pattern of unused resource element locations;
   wherein the uplink control coding rate defines a number of bits of the uplink control data that is to be transmitted over the plurality of uplink control resource elements;
   wherein the uplink control coding rate is a modulation and coding scheme (MCS) of an uplink control channel.

2. The method of claim 1, further comprising encoding the uplink control data based on the uplink control coding rate.

3. The method of claim 2, wherein the plurality of uplink control resource elements contain the encoded uplink control data.

4. The method of claim 1, wherein the applying of the pattern of unused resource element locations based on the uplink control coding rate comprises applying the pattern of unused resource element locations when the uplink control coding rate is a lowest uplink control coding rate.

5. The method of claim 4, wherein the uplink control coding rate is transmitted coherently in the plurality of uplink control resource elements when the uplink control coding rate is different from the lowest uplink control coding rate.

6. The method of claim 1, wherein the uplink control coding rate is conveyed based on combining location of unused resource elements and coherent transmission of a plurality of used resource elements.

7. The method of claim 1, wherein the plurality of uplink control resource elements are located in PUCCH.

8. A method of wireless communication of a base station, comprising:
receiving a plurality of uplink control resource elements;
determining an uplink control coding rate based on a pattern of resource element locations in the plurality of uplink control resource elements, wherein the uplink control coding rate is determined based on an uplink signal quality and defines a number of bits of uplink control data that is to be transmitted over the plurality of uplink control resource elements, wherein the uplink control coding rate is a modulation and coding scheme (MCS) of an uplink control channel, wherein the pattern of resource element locations comprises a plurality of resource elements located in a plurality of symbols and a plurality of subcarriers; and
decoding the uplink control data based on the uplink control coding rate.

9. The method of claim 8, wherein the plurality of uplink control resource elements contain the uplink control data.

10. The method of claim 8, wherein the determining of the uplink control coding rate based on the pattern of resource element locations comprises:
measuring an energy of each resource element of the plurality of resource elements in the pattern of resource element locations;
calculating a sum of the measured energy of each resource element of the plurality of resource elements; and
determining the uplink control coding rate based on the sum of the measured energy of each resource element of the plurality of resource elements.

11. The method of claim 10, wherein the determining of the uplink control coding rate based on the sum of the measured energy of each resource element of the plurality of resource elements comprises determining that the uplink control coding rate is a lowest uplink control coding rate when the sum of the measured energy of each resource element of the plurality of resource elements is less than a threshold.

12. The method of claim 11, wherein the determining of the uplink control coding rate based on the pattern of resource element locations further comprises determining the uplink control coding rate based on information transmitted coherently in the plurality of uplink control resource elements when the sum of the measured energy of each resource element of the plurality of resource elements is greater than or equal to the threshold.

13. An apparatus for wireless communication, the apparatus being a user equipment (UE), comprising:
a memory; and
at least one processor coupled to the memory and configured to:
determine an uplink control coding rate based on an uplink signal quality;
apply a pattern of unused resource element locations in a plurality of uplink control resource elements based on the uplink control coding rate, wherein the pattern of unused resource element locations comprises a plurality of unused resource elements located in a plurality of symbols and a plurality of subcarriers; and
transmit the plurality of uplink control resource elements with the pattern of unused resource element locations;
wherein the uplink control coding rate defines a number of bits of the uplink control data that is to be transmitted over the plurality of uplink control resource elements;
wherein the uplink control coding rate is a modulation and coding scheme (MCS) of an uplink control channel.

14. The apparatus of claim 13, wherein the at least one processor is further configured to encode the uplink control data based on the uplink control coding rate, wherein the plurality of uplink control resource elements contain the encoded uplink control data.

15. The apparatus of claim 13, wherein, to apply the pattern of unused resource element locations based on the uplink control coding rate, the at least one processor is configured to apply the pattern of unused resource element locations when the uplink control coding rate is a lowest uplink control coding rate.

16. The apparatus of claim 15, wherein the uplink control coding rate is transmitted coherently in the plurality of uplink control resource elements when the uplink control coding rate is different from the lowest uplink control coding rate.

17. The apparatus of claim 13, wherein the uplink control coding rate is conveyed based on combining location of unused resource elements and coherent transmission of a plurality of used resource elements.

18. The apparatus of claim 13, wherein the plurality of uplink control resource elements are located in PUCCH.

19. An apparatus for wireless communication, the apparatus being a base station, comprising:
a memory; and
at least one processor coupled to the memory and configured to:
receive a plurality of uplink control resource elements;
determine an uplink control coding rate based on a pattern of resource element locations in the plurality of uplink control resource elements, wherein the uplink control coding rate is determined based on an uplink signal quality and defines a number of bits of uplink control data that is to be transmitted over the plurality of uplink control resource elements, wherein the uplink control coding rate is a modulation and coding scheme (MCS) of an uplink control channel, wherein the pattern of resource element locations comprises a plurality of resource elements located in a plurality of symbols and a plurality of subcarriers; and
decode the uplink control data based on the uplink control coding rate.

20. The apparatus of claim 19, wherein the plurality of uplink control resource elements contain the uplink control data.

21. The apparatus of claim 19, wherein, to determine the uplink control coding rate based on the pattern of resource element locations, the at least one processor is configured to:
   measure an energy of each resource element the plurality of resource elements in the pattern of resource element locations;
   calculate a sum of the measured energy of each resource element of the plurality of resource elements; and
   determine the uplink control coding rate based on the sum of the measured energy of each resource element of the plurality of resource elements.

22. The apparatus of claim 21, wherein, to determine the uplink control coding rate based on the sum of the measured energy of each resource element of the plurality of resource elements, the at least one processor is configured to determine that the uplink control coding rate is a lowest uplink control coding rate when the sum of the measured energy of each resource element of the plurality of resource elements is less than a threshold.

* * * * *